(12) United States Patent
Seidel et al.

(10) Patent No.: US 10,597,529 B2
(45) Date of Patent: Mar. 24, 2020

(54) GLASS-FIBRE-REINFORCED POLYCARBONATE MOULDING COMPOSITIONS WITH IMPROVED TOUGHNESS

(71) Applicant: Covestro Deutschland AG, Leverkusen (DE)

(72) Inventors: Andreas Seidel, Dormagen (DE); Kristina Pupovac, Düsseldorf (DE); Sven Hobeika, Solingen (DE)

(73) Assignee: Covestro Deutschland AG, Leverkusen (DE)

( * ) Notice: Subject to any disclaimer, the term of this patent is extended or adjusted under 35 U.S.C. 154(b) by 4 days.

(21) Appl. No.: 15/580,348

(22) PCT Filed: Jun. 7, 2016

(86) PCT No.: PCT/EP2016/062903
§ 371 (c)(1),
(2) Date: Dec. 7, 2017

(87) PCT Pub. No.: WO2016/198403
PCT Pub. Date: Dec. 15, 2016

(65) Prior Publication Data
US 2018/0179379 A1 Jun. 28, 2018

(30) Foreign Application Priority Data

Jun. 9, 2015 (EP) ...................... 15171172

(51) Int. Cl.
*C08L 69/00* (2006.01)
*C08L 25/12* (2006.01)
*C08K 9/04* (2006.01)
*C08L 51/04* (2006.01)
*C08K 7/14* (2006.01)

(52) U.S. Cl.
CPC ............. *C08L 69/00* (2013.01); *C08K 9/04* (2013.01); *C08L 25/12* (2013.01); *C08L 51/04* (2013.01); *C08L 69/005* (2013.01); *C08K 7/14* (2013.01)

(58) Field of Classification Search
None
See application file for complete search history.

(56) References Cited

U.S. PATENT DOCUMENTS

| | | | |
|---|---|---|---|
| 2,891,920 A | 6/1959 | Hyde et al. | |
| 3,294,725 A | 12/1966 | Findlay et al. | |
| 3,419,634 A | 12/1968 | Vaughn, Jr. | |
| 3,553,167 A | 1/1971 | Schnell et al. | |
| 4,075,173 A | 2/1978 | Maruyama et al. | |
| 4,269,964 A | 5/1981 | Freitag et al. | |
| 4,311,823 A | 1/1982 | Imai et al. | |
| 4,334,053 A | 6/1982 | Freitag et al. | |
| 4,584,360 A | 4/1986 | Paul et al. | |
| 4,806,593 A | 2/1989 | Kress et al. | |
| 4,812,515 A | 3/1989 | Kress et al. | |
| 4,859,740 A | 8/1989 | Damrath et al. | |
| 4,861,831 A | 8/1989 | Damrath et al. | |
| 4,888,388 A | 12/1989 | Hongo et al. | |
| 5,807,914 A | 9/1998 | Obayashi et al. | |
| 8,779,033 B2 | 7/2014 | Seidel et al. | |
| 9,296,893 B2 | 3/2016 | Erkelenz et al. | |
| 2002/0147261 A1* | 10/2002 | Warth | C08L 69/00 524/451 |
| 2006/0094813 A1 | 5/2006 | Warth et al. | |
| 2009/0082516 A1* | 3/2009 | Seidel | C08L 69/00 524/494 |
| 2014/0243467 A1* | 8/2014 | Dern | C08L 69/00 524/508 |
| 2015/0011689 A1* | 1/2015 | Erkelenz | C08K 5/0066 524/165 |

FOREIGN PATENT DOCUMENTS

| | | |
|---|---|---|
| DE | 1495626 B1 | 6/1971 |
| DE | 2232877 A1 | 1/1974 |
| DE | 2703376 A1 | 8/1977 |
| DE | 2842005 A1 | 4/1980 |
| DE | 3000610 A1 | 7/1980 |
| DE | 2940024 A1 | 4/1981 |
| DE | 3007934 A1 | 9/1981 |
| DE | 3334782 A1 | 10/1984 |

(Continued)

OTHER PUBLICATIONS 3B the Fibreglass Company Product Brochure for CS 108F-14P (2014). (Year: 2014).*

(Continued)

*Primary Examiner* — David J Buttner
(74) *Attorney, Agent, or Firm* — Drinker Biddle & Reath LLP

(57) ABSTRACT

Compositions comprising
A) from 40 to 80 parts by weight of aromatic polycarbonate or polyester carbonate,
B) from 10 to 40 parts by weight of rubber-free vinyl copolymer,
C) from 5 to 20 parts by weight of organically surface-modified chopped glass fibre,
D) from 0 to 9 parts by weight of a graft polymer with an elastomeric graft base,
E) from 0 to 20 parts by weight of additives,
where the sum of the parts by weight of components A) to E) in the composition is standardized to 100,
characterized in that
(i) a size composed of an organic compound or a mixture of various organic compounds is used as surface-modification of the glass fibre at a concentration such that the carbon content of component C is from 0.2 to 2% by weight,
(ii) the ratio of the integrated peak area of the FTIR spectrum in the wave number range from 2700 to 3000 cm$^{-1}$ to the integrated peak area of the FTIR spectrum in the wave number range from 500 to 4000 cm$^{-1}$, in each case measured on the dichloromethane-extracted content of this size of component C, is from 0.20 to 0.70,
have improved toughness (impact resistance, notched impact resistance, performance on exposure to multiaxial impact and/or tensile strain at break) in comparison with the prior art and, because they have good melt flowability and increased tensile modulus of elasticity, are suitable for use in the production of mouldings.

12 Claims, No Drawings

(56) References Cited

FOREIGN PATENT DOCUMENTS

| | | |
|---|---|---|
| DE | 3631539 A1 | 3/1988 |
| DE | 3631540 A1 | 3/1988 |
| DE | 3704655 A1 | 8/1988 |
| DE | 3704657 A1 | 8/1988 |
| DE | 3832396 A1 | 2/1990 |
| DE | 102007038438 A1 | 2/2009 |
| EP | 249964 A2 | 12/1987 |
| EP | 430134 A2 | 6/1991 |
| EP | 0624621 A2 | 11/1994 |
| EP | 2554594 A1 | 2/2013 |
| GB | 1552558 A | 9/1979 |
| WO | WO-8404317 A1 | 11/1984 |
| WO | WO-2006040087 A1 | 4/2006 |
| WO | WO-2009021648 A1 | 2/2009 |
| WO | WO-2013/045552 * | 4/2013 |
| WO | WO-2013/079633 * | 6/2013 |
| WO | WO-2013079631 A1 | 6/2013 |

OTHER PUBLICATIONS

International Search Report for PCT/EP2016/062903 dated Jul. 19, 2016.
Written Opinion of the International Searching Authority for PCT/EP2016/062903 dated Jul. 19, 2016.

* cited by examiner

GLASS-FIBRE-REINFORCED POLYCARBONATE MOULDING COMPOSITIONS WITH IMPROVED TOUGHNESS

CROSS-REFERENCE TO RELATED APPLICATIONS

This application is a national stage application (under 35 U.S.C. § 371) of PCT/EP2016/062903, filed Jun. 7, 2016, which claims benefit of European Application No. 15171172.8, filed Jun. 9, 2015, both of which are incorporated herein by reference in their entirety.

The invention relates to polycarbonate compositions with increased tensile modulus of elasticity due to glass-fibre reinforcement, and to moulding compositions with good melt flowability which, in comparison with the prior art, feature improved toughness, (impact resistance, notched impact resistance, performance on exposure to multiaxial impact and/or tensile strain at break).

Compositions comprising polycarbonate and a rubber-modified styrene polymers, for example ABS (acrylonitrile-butadiene-styrene polymers) are known for their good balance of excellent mechanical properties and good flowability. They are used in a very wide variety of application sectors, for example in automobile construction, in the construction sector, and also in housings of office machinery and domestic and electrical equipment.

BACKGROUND OF THE INVENTION

Production of large-surface-area mouldings generally requires a low coefficient of thermal expansion, and also good dimensional stability and geometric stability, and high stiffness. These properties can be achieved by adding fillers or reinforcing materials. High tensile moduli of elasticity can in particular be realized by adding fibrous reinforcing materials with high aspect ratio, i.e. with a large fibre length/fibre diameter quotient. Materials particularly attractive in technical terms for this purpose are glass fibres or carbon fibres, and from a commercial point of view particular preference is given to glass fibres; chopped fibres are particularly easy to handle in the production of the compounded materials and are therefore particularly preferred because they can be used in commercially available compounding assemblies such as single- and twin-screw extruders, preferably with side-feed of the glass fibres directly into the previously melted and dispersed polymer composition. However, addition of the fillers, and in particular addition of glass fibres and carbon fibres, has a severe adverse effect on the toughness of the moulding compositions. These circumstances place practical limitations on the reinforcing materials that can be used and the fill levels that can be realized, and therefore the stiffness values that can be achieved for the material. These filler-reinforced polymer compositions of the prior art therefore often have inadequate scope for application. In particular, these reinforced polymer compositions disclosed in the prior art cannot realize very thin-walled large-surface-area mouldings or applications with relatively high component-ductility requirements, for example structural or safety components for the automobile sector, or can do so only by incurring relatively high engineering costs. For these application sectors there is therefore a requirement for provision of polymer compositions with good processability in the injection-moulding process (high melt flowability) and with a combination of high tensile modulus of elasticity and improved ductility not only on exposure to unidirectional impact but also in particular on exposure to multiaxial load, for example in the drop test. Because use of innovative processing technologies, for example variotherm injection moulding, can now produce excellent surface appearance (class A surface) even when reinforced polymer materials are used, there is also an increasing trend towards use of uncoated components produced from such compositions, in order to save costs. A preferred embodiment of this trend requires the provision of reinforced polymer compositions which have good processability and a combination of high modulus of elasticity and improved ductility and which moreover exhibit good resistance to ageing effects caused by, for example, light and heat, and preferably also to contact with chemicals (stress-cracking resistance), without any need for further surface finishing (coating).

Glass-fibre-reinforced polycarbonate compositions comprising rubber-modified vinyl copolymers are in principle already known from the prior art. However, the polycarbonate compositions of the prior art do not exhibit the combination of all of the desired property features previously described. In particular, the ductility of the material is generally unsatisfactory in these polycarbonate compositions where the quantity of glass fibres used is suitable to achieve stiffness values that are adequate for thin-walled applications.

EP 0 624 621 A2 discloses polycarbonate compositions with improved toughness and ductility comprising from 10 to 80% by weight of polycarbonate, from 10 to 80% by weight of rubber-modified graft copolymer and from 5 to 50% by weight of glass fibres, with a coating comprising polyolefin wax.

WO 84/04317 A1 discloses polycarbonate compositions with high impact resistance and high modulus comprising polycarbonate, styrene resin, optionally up to 10 parts by weight, based on the entirety of polycarbonate, styrene resin, glass fibre and silicone, of impact modifier, glass fibres and a polyhydrogensiloxane, an essential criterion of the invention here being use of unsized glass fibres.

EP 1 802 696 A1 discloses long-glass-fibre-reinforced polymer compositions with an improved combination of mechanical properties, in particular tensile strength, tensile modulus of elasticity and impact resistance, comprising at least one polymer selected from the group of the polyamides, polycarbonates, polyester carbonates, graft polymers and copolymers, and also comprising a terpolymer of styrene, acrylonitrile and maleic anhydride and long glass fibres.

WO 2009/021648 A1 and the associated DE 10 2007 038438 A1 disclose glass-fibre-reinforced polycarbonate compositions with high stiffness, impact resistance, flowability, processing stability, and chemical resistance, and good ageing resistance to effects caused by light and by heat, comprising from 10 to 85 parts by weight of polycarbonate, from 10 to 50 parts by weight of rubber-free vinyl copolymer, from 5 to 50 parts by weight of epoxy-sized glass fibres, from 0 to 2 parts by weight of rubber-modified graft polymer and from 0 to 10 parts by weight of polymer additives. The glass fibre C-1 used according to the invention in this prior art is also termed component C-1 in the experimental section of the present application, and is used in comparative examples.

However, the melt-flowability, ageing resistance, stiffness and/or ductility of the glass-fibre-reinforced polycarbonate compositions disclosed in the prior art is inadequate for critical applications.

BRIEF SUMMARY OF THE INVENTION

The object underlying this invention was therefore to provide free-flowing polycarbonate moulding compositions which have increased tensile moduli of elasticity due to glass-fibre reinforcement and which have improved toughness (impact resistance, notched impact resistance, performance on exposure to multiaxial impact and/or tensile strain at break) in comparison with the prior art, and which moreover preferably feature good resistance to ageing effects caused, by way of example and preferably, by light and heat, and which also likewise preferably feature good stability in contact with chemicals (stress-cracking resistance), and which in a particularly preferred embodiment have a tensile modulus of elasticity of at least 4000 MPa.

Surprisingly, it has been found that glass-fibre-reinforced, impact-modified PC/SAN compositions comprising A) from 40 to 80 parts by weight, preferably from 50 to 70 parts by weight, particularly preferably from 57 to 65 parts by weight, of aromatic polycarbonate or polyester carbonate, preferably aromatic polycarbonate based on bisphenol A, B) from 10 to 40 parts by weight, preferably from 15 to 30 parts by weight, particularly preferably from 20 to 25 parts by weight, of rubber-free vinyl copolymer, preferably styrene-acrylonitrile copolymer, C) from 5 to 20 parts by weight, preferably from 7 to 15 parts by weight, particularly preferably from 9 to 14 parts by weight, of organically surface-modified chopped glass fibre, D) from 0 to 9 parts by weight, preferably from 1 to 8 parts by weight, particularly preferably from 2.5 to 6 parts by weight, of a graft polymer with an elastomeric, preferably butadiene-free, particularly preferably in essence carbon-carbon-double-bond-free graft base, E) from 0 to 20 parts by weight, preferably from 0.1 to 10 parts by weight, particularly preferably from 0.2 to 5 parts by weight, of additives, where the sum of the parts by weight of components A) to E) in the composition is standardized to 100, characterized in that (i) a size which optionally couples to some extent chemically to the glass fibre and is composed of an organic compound or a mixture of various organic compounds is used as surface-modification of the glass fibre at a concentration such that the carbon content of component C is from 0.2 to 2% by weight, preferably from 0.3 to 1.0% by weight, particularly preferably from 0.4 to 0.8% by weight, (ii) the ratio of the integrated peak area of the FTIR spectrum in the wave number range from 2700 to 3000 $cm^{-1}$ to the integrated peak area of the FTIR spectrum in the wave number range from 500 to 4000 $cm^{-1}$, in each case measured on the dichloromethane-extracted content of this size of component C, is from 0.20 to 0.70, preferably from 0.25 to 0.60, particularly preferably from 0.30 to 0.55, have the desired property profile.

In an embodiment to which further preference is given, the compositions are composed only of components A) to E).

In a preferred embodiment, the compositions of the invention comprise no butadiene-based polymers of any kind.

In an embodiment to which further preference is given, component D is based on a graft base that is in essence carbon-carbon-double-bond-free.

During production of the compositions of the invention in conventional compounding processes, and also during further shaping processes (for example injection moulding) the length of the glass fibres used is generally reduced as a result of the shearing exerted in these steps.

In a preferred embodiment, the length of at least 70% by weight of the glass fibres, based on the glass fibres, in the compounded material produced (i.e. the moulding composition after compounding), is more than 50 μm, particularly preferably at least 70 μm, in particular at least 100 μm.

In another embodiment, the length of at least 70% by weight of the glass fibres, based on the glass fibres, in the moulding produced therefrom, is also more than 50 μm, particularly preferably at least 70 μm, in particular at least 100 μm.

DETAILED DESCRIPTION OF THE INVENTION

Preferred embodiments 1 to 34 of the present invention are described below:

1. Compositions comprising
    A) from 40 to 80 parts by weight of aromatic polycarbonate or polyester carbonate,
    B) from 10 to 40 parts by weight of rubber-free vinyl copolymer,
    C) from 5 to 20 parts by weight of organically surface-modified chopped glass fibre,
    D) from 0 to 9 parts by weight of a graft polymer with an elastomeric graft base,
    E) from 0 to 20 parts by weight of additives,
    where the sum of the parts by weight of components A) to E) in the composition is standardized to 100,
    characterized in that
    (i) a size composed of an organic compound or a mixture of various organic compounds is used as surface-modification of the glass fibre at a concentration such that the carbon content of component C is from 0.2 to 2% by weight,
    the ratio of the integrated peak area of the FTIR spectrum in the wave number range from 2700 to 3000 $cm^{-1}$ to the integrated peak area of the FTIR spectrum in the wave number range from 500 to 4000 $cm^{-1}$, in each case measured on the dichloromethane-extracted content of this size of component C, is from 0.20 to 0.70.

2. Compositions according to Embodiment 1 comprising
    A) from 57 to 65 parts by weight of aromatic polycarbonate or polyester carbonate,
    B) from 20 to 25 parts by weight of rubber-free, thermoplastic and resin-like vinyl copolymer,
    C) from 9 to 14 parts by weight of organically surface-modified chopped glass fibre,
    D) from 2.5 to 6 parts by weight of a graft polymer with an elastomeric graft base,
    E) from 0.2 to 5 parts by weight of additives,
    where the sum of the parts by weight of components A) to E) in the composition composition is standardized to 100.

3. Compositions according to Embodiment 1 comprising
    A) from 57 to 65 parts by weight of aromatic polycarbonate or polyester carbonate,
    B) from 15 to 30 parts by weight of rubber-free, thermoplastic and resin-like vinyl copolymer,
    C) from 7 to 15 parts by weight of organically surface-modified chopped glass fibre,
    D) from 1 to 8 parts by weight of a graft polymer with an elastomeric graft base,
    E) from 0.1 to 10 parts by weight of additives,
    where the sum of the parts by weight of components A) to E) in the composition composition is standardized to 100.

4. Compositions according to Embodiment 1 comprising
   A) from 57 to 65 parts by weight of aromatic polycarbonate or polyester carbonate,
   B) from 15 to 30 parts by weight of rubber-free, thermoplastic and resin-like vinyl copolymer,
   C) from 7 to 15 parts by weight of organically surface-modified chopped glass fibre,
   D) from 2.5 to 6 parts by weight of a graft polymer with an elastomeric graft base,
   E) from 0.1 to 10 parts by weight of additives,
   where of the sum of the parts by weight of components A) to E) in the composition is standardized to 100.
5. Compositions according to Embodiment 1 comprising
   A) from 57 to 65 parts by weight of aromatic polycarbonate or polyester carbonate,
   B) from 15 to 30 parts by weight of rubber-free, thermoplastic and resin-like vinyl copolymer,
   C) from 7 to 15 parts by weight of organically surface-modified chopped glass fibre,
   D) from 1 to 8 parts by weight of a graft polymer with an elastomeric graft base,
   E) from 0.2 to 5 parts by weight of additives,
   where of the sum of the parts by weight of components A) to E) in the composition is standardized to 100.
6. Compositions according to Embodiment 1 comprising
   A) from 57 to 65 parts by weight of aromatic polycarbonate or polyester carbonate,
   B) from 15 to 30 parts by weight of rubber-free, thermoplastic and resin-like vinyl copolymer,
   C) from 7 to 15 parts by weight of organically surface-modified chopped glass fibre,
   D) from 2.5 to 6 parts by weight of a graft polymer with an elastomeric graft base,
   E) from 0.2 to 5 parts by weight of additives,
   where of the sum of the parts by weight of components A) to E) in the composition is standardized to 100.
7. Compositions according to any of the previous embodiments, characterized in that the carbon content of component C is from 0.4 to 0.8% by weight.
8. Compositions according to any of the preceding embodiments, characterized in that the ratio of the integrated peak area of the FTIR spectrum in the wave number range from 2700 to 3000 $cm^{-1}$ to the integrated peak area of the FTIR spectrum in the wave number range from 500 to 4000 $cm^{-1}$, in each case measured on the dichloromethane-extracted content of this size of component C, is from 0.25 to 0.60.
9. Compositions according to any of the preceding embodiments, characterized in that the ratio of the integrated peak area of the FTIR spectrum in the wave number range from 2700 to 3000 $cm^{-1}$ to the integrated peak area of the FTIR spectrum in the wave number range from 500 to 4000 $cm^{-1}$, in each case measured on the dichloromethane-extracted content of this size of component C, is from 0.30 to 0.55.
10. Compositions according to any of the preceding embodiments, characterized in that the ratio of the integrated peak area of the FTIR spectrum in the wave number range from 2700 to 3000 $cm^{-1}$ to the integrated peak area of the FTIR spectrum in the wave number range from 500 to 4000 $cm^{-1}$, in each case measured on the dichloromethane-extracted content of this size of component C, is from 0.20 to 0.60.
11. Compositions according to any of the preceding embodiments, characterized in that the ratio of the integrated peak area of the FTIR spectrum in the wave number range from 2700 to 3000 $cm^{-1}$ to the integrated peak area of the FTIR spectrum in the wave number range from 500 to 4000 $cm^{-1}$, in each case measured on the dichloromethane-extracted content of this size of component C, is from 0.20 to 0.55.
12. Compositions according to any of the preceding embodiments, characterized in that the ratio of the integrated peak area of the FTIR spectrum in the wave number range from 2700 to 3000 $cm^{-1}$ to the integrated peak area of the FTIR spectrum in the wave number range from 500 to 4000 $cm^{-1}$, in each case measured on the dichloromethane-extracted content of this size of component C, is from 0.25 to 0.70.
13. Compositions according to any of the preceding embodiments, characterized in that the ratio of the integrated peak area of the FTIR spectrum in the wave number range from 2700 to 3000 $cm^{-1}$ to the integrated peak area of the FTIR spectrum in the wave number range from 500 to 4000 $cm^{-1}$, in each case measured on the dichloromethane-extracted content of this size of component C, is from 0.25 to 0.55.
14. Compositions according to any of the preceding embodiments, characterized in that the ratio of the integrated peak area of the FTIR spectrum in the wave number range from 2700 to 3000 $cm^{-1}$ to the integrated peak area of the FTIR spectrum in the wave number range from 500 to 4000 $cm^{-1}$, in each case measured on the dichloromethane-extracted content of this size of component C, is from 0.30 to 0.70.
15. Compositions according to any of the preceding embodiments, characterized in that the ratio of the integrated peak area of the FTIR spectrum in the wave number range from 2700 to 3000 $cm^{-1}$ to the integrated peak area of the FTIR spectrum in the wave number range from 500 to 4000 $cm^{-1}$, in each case measured on the dichloromethane-extracted content of this size of component C, is from 0.30 to 0.60.
16. Compositions according to any of the preceding embodiments, characterized in that the graft base of component B is selected from at least one member of the group consisting of silicone rubber, acrylate rubber and silicone-acrylate composite rubber.
17. Compositions according to any of the preceding embodiments, characterized in that the graft base of component B is acrylate rubber.
18. Compositions according to any of the preceding embodiments, characterized in that the length of at least 70% of the glass fibres in the compound produced is at least 100 μm.
19. Compositions according to any of the preceding embodiments, characterized in that before compounding the average diameter of the glass fibres used for the production of the composition is from 7 to 15 μm.
20. Compositions according to any of the preceding embodiments, characterized in that before compounding the average aspect ratio, i.e. the average fibre length: average fibre diameter quotient, of the glass fibres used for the production of the composition is at least 300.
21. Compositions according to any of the preceding embodiments, characterized in that at least one substance having aliphatic hydrocarbon chains comprising few or no functional polar groups is used as substantive component in the size for the glass fibres.
22. Compositions according to any of the preceding embodiments, characterized in that the proportion present of component E is at least 0.1 part by weight and component E comprises at least one inorganic pigment.

23. Compositions according to any of the preceding embodiments, characterized in that a styrene-acrylonitrile copolymer with weight-average molar mass not more than 140 000 g/mol, determined by gel permeation chromatography in THF with polystyrene standards, is used as component B.
24. Compositions according to any of the preceding embodiments, characterized in that a polycarbonate based on bisphenol A is used as component A.
25. Compositions according to any of the preceding embodiments, characterized in that the weight-average molar mass of component A is from 26 000 to 30 000 g/mol, determined by gel permeation chromatography in dichloromethane with polycarbonate standards.
26. Compositions according to any of the preceding embodiments, comprising, as component E, at least one additional substance selected from the group comprising flame retardants, antidripping agents, flame retardant synergists, smoke inhibitors, lubricants and mould-release agents, nucleating agents, antistatic agents, conductivity agents, stabilizers, flowability promoters, compatibilizers, other impact modifiers differing from component D, other polymeric blend partners, fillers differing from component C, reinforcing materials differing from component C, dyes and pigments.
27. Compositions according to any of the preceding embodiments, comprising as component at least one component selected from the group consisting of mould-release agents and stabilizers.
28. Compositions according to any of the preceding embodiments, characterized in that pentaerithritol tetrastearate is used as mould-release agent and at least one member selected from the group consisting of phenolic antioxidant and phosphite stabilizer is used as stabilizer.
29. Compositions according to any of the preceding embodiments, characterized in that titanium dioxide is used as pigment.
30. Compositions according to any of the preceding embodiments, characterized in that the compositions are composed only of components A) to E).
31. Use of compositions according to any of Embodiments 1 to 30 for the production of injection mouldings or thermoformed mouldings.
32. Mouldings obtainable from compositions according to any of Embodiments 1 to 30.
33. Mouldings according to Embodiment 32, characterized in that the length of at least 70% by weight of the glass fibres in the moulding, based on the glass fibres, is more than 100 µm.
34. Use of glass fibres with surface modification made of a size composed of an organic compound or a mixture of various organic compounds at a concentration such that the carbon content of component C is from 0.2 to 2% by weight,
where the ratio of the integrated peak area of the FTIR spectrum in the wave number range from 2700 to 3000 cm$^{-1}$ to the integrated peak area of the FTIR spectrum in the wave number range from 500 to 4000 cm$^{-1}$, in each case measured on the dichloromethane-extracted content of this size of component C, is from 0.20 to 0.70,
to improve the impact resistance, notch impact resistance and multiaxial ductility of polycarbonate compositions with tensile modulus of elasticity at least 4000 MPa.

It is preferable that the modulus of elasticity, measured in accordance with ISO 527 (1996 Version) at room temperature, of the polycarbonate compositions of the invention and therefore also of the abovementioned embodiments is at least 3500 MPa, particularly at least 3800 MPa, in particular at least 4000 MPa. That also applies to the embodiments listed above.

It is preferable that the tensile strain at break, measured in accordance with ISO 527 (1996 Version) at room temperature, of the polycarbonate compositions of the invention and therefore also of the abovementioned embodiments is at least 7%, particularly at least 10%, in particular at least 12%.

It is preferable that the impact resistance, measured in accordance with ISO 180/1U (1982 Version) at room temperature, of the polycarbonate compositions of the invention and therefore also of the abovementioned embodiments is at least 50 kJ/m$^2$, particularly at least 60 kJ/m$^2$, in particular at least 70 kJ/m$^2$.

It is preferable that the notch impact resistance, measured in accordance with ISO 180/1A (1982 Version) at room temperature, of the polycarbonate compositions of the invention and therefore also of the abovementioned embodiments is at least 8 kJ/m$^2$, particularly at least 10 kJ/m$^2$, in particular at least 12 kJ/m$^2$.

The maximal damage-free energy absorption (critical energy) at room temperature of the polycarbonate compositions of the invention and therefore also of the abovementioned embodiments is preferably at least 2 J, preferably 4 J, particularly 8 J, determined in accordance with the method described in the experimental section.

It is preferable that the melt viscosity, measured in accordance with ISO 11443 (2014 Version) at a temperature of 260° C. and a shear rate of 1000 s$^{-1}$, of the polycarbonate compositions of the invention and therefore also of the abovementioned embodiments is at most 270 Pas, particularly at most 250 Pas, in particular at most 230 Pas.

Component A

Aromatic polycarbonates and/or aromatic polyester carbonates according to component A which are suitable according to the invention are known from the literature or can be produced by processes known from the literature (for production of aromatic polycarbonate see by way of example Schnell, "Chemistry and Physics of Polycarbonates", Interscience Publishers, 1964 and also DE-AS (German Published Specification) 1 495 626, DE-A 2 232 877, DE-A 2 703 376, DE-A 2 714 544, DE-A 3 000 610, DE-A 3 832 396; for production of aromatic polyester carbonates see by way of example DE-A 3 077 934).

Aromatic polycarbonates are produced by way of example by reaction of diphenols with carbonyl halides, preferably phosgene and/or with aromatic diacyl dihalides, preferably dihalides of benzenedicarboxylic acids, by the interfacial process, optionally with use of chain terminators, for example monophenols, and optionally with use of trifunctional or more than trifunctional branching agents, for example triphenols or tetraphenols. Another possible production method uses a melt polymerization process via reaction of diphenols with, for example, diphenyl carbonate.

Diphenols for producing the aromatic polycarbonates and/or aromatic polyester carbonates are preferably those of the formula (I)

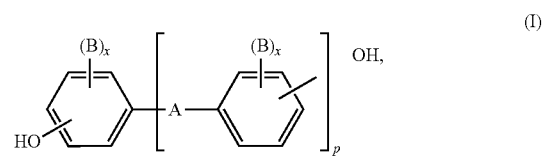

where

A is a single bond, $C_1$ to $C_5$-alkylene, $C_2$ to $C_5$-alkylidene, $C_5$ to $C_6$-cycloalkylidene, —O—, —SO—, —CO—, —S—, —SO$_2$—, $C_6$ to $C_{12}$-arylene, onto which further aromatic rings optionally comprising heteroatoms can have been condensed, or a moiety of the formula (II) or (III)

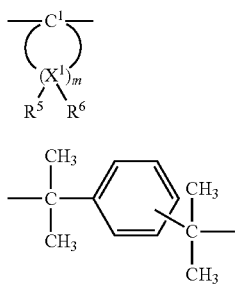

(II)

(III)

B is in each case $C_1$ to $C_{12}$-alkyl, preferably methyl, halogen, preferably chlorine and/or bromine, x is mutually independently respectively 0, 1 or 2, p is 1 or 0, and $R^5$ and $R^6$ can be selected individually for each $X^1$, being mutually independently hydrogen or $C_1$ to $C_6$-alkyl, preferably hydrogen, methyl or ethyl, $X^1$ is carbon and m is an integer from 4 to 7, preferably 4 or 5, with the proviso that on at least one atom $X^1$, $R^5$ and $R^6$ are simultaneously alkyl.

Preferred diphenols are hydroquinone, resorcinol, dihydroxydiphenols, bis(hydroxyphenyl)-$C_1$-$C_5$-alkanes, bis(hydroxyphenyl)-$C_5$-$C_6$-cycloalkanes, bis(hydroxyphenyl) ether, bis(hydroxyphenyl) sulphoxides, bis(hydroxyphenyl) ketones, bis(hydroxyphenyl) sulphones and α,α-bis(hydroxyphenyl)diisopropylbenzenes, and also ring-brominated and/or ring-chlorinated derivatives of these.

Particularly preferred diphenols are 4,4'-dihydroxybiphenyl, bisphenol A, 2,4-bis(4-hydroxyphenyl)-2-methylbutane, 1,1-bis(4-hydroxyphenyl)cyclohexane, 1,1-bis(4-hydroxyphenyl)-3,3,5-trimethylcyclohexane, 4,4'-dihydroxydiphenyl sulphide, 4,4'-dihydroxydiphenyl sulphone, and also the di- and tetrabrominated or chlorinated derivatives of these, for example 2,2-bis(3-chloro-4-hydroxyphenyl)propane, 2,2-bis(3,5-dichloro-4-hydroxyphenyl)propane or 2,2-bis(3,5-dibromo-4-hydroxyphenyl)propane, 2,2-Bis(4-hydroxyphenyl)propane (bisphenol A) is in particular preferred.

The diphenols may be used individually or in the form of any desired mixtures. The diphenols are known from the literature or obtainable by processes known from the literature.

Examples of chain terminators suitable for the production of the thermoplastic aromatic polycarbonates include phenol, p-chlorophenol, p-tert-butylphenol or 2,4,6-tribromophenol, and also long-chain alkylphenols such as 4-[2-(2,4,4-trimethylpentyl)]phenol, 4-(1,3-tetramethylbutyl) phenol according to DE-A 2 842 005 and monoalkylphenol or dialkylphenols having a total of from 8 to 20 carbon atoms in the alkyl substituents, for example 3,5-di-tert-butylphenol, p-isooctylphenol, p-tert-octylphenol, p-dodecylphenol and 2-(3,5-dimethylheptyl)phenol and 4-(3,5-dimethylheptyl)phenol. The quantity of chain terminators to be used is generally from 0.5 mol % to 10 mol %, based on entire molar quantities of the respective diphenols used.

The thermoplastic aromatic polycarbonates may be branched in a known manner, and specifically preferably through incorporation of 0.05 to 2.0 mol %, based on the entirety of the diphenols used, of trifunctional or more than trifunctional compounds, for example those having three or more phenolic groups.

Both homopolycarbonates and copolycarbonates are suitable. For production of copolycarbonates of the invention according to component A it is also possible to use from 1 to 25% by weight, preferably from 2.5 to 25% by weight, based on the total quantity of diphenols to be used, of polydiorganosiloxanes having hydroxyaryloxy end groups. These are known (U.S. Pat. No. 3,419,634) and can be produced by processes known from the literature. The production of copolycarbonates comprising polydiorganosiloxane is described in DE-A 3 334 782.

Preferred polycarbonates, alongside the bisphenol A homopolycarbonates, are the copolycarbonates of bisphenol A with up to 15 mol %, based on the entire molar quantities of diphenols, of other diphenols mentioned as preferred or particularly preferred, in particular 2,2-bis(3,5-dibromo-4-hydroxyphenyl)propane.

Aromatic diacyl dihalides for production of aromatic polyester carbonates are preferably the diacyl dichlorides of isophthalic acid, of terephthalic acid, of diphenyl ether 4,4'-dicarboxylic acid and of naphthalene-2,6-dicarboxylic acid.

Particular preference is given to mixtures of the diacyl dichlorides of isophthalic acid and of terephthalic acid in a ratio of from 1:20 to 20:1.

Production of polyester carbonates additionally makes concomitant use of a carbonyl halide, preferably phosgene, as bifunctional acid derivative.

Chain terminators that can be used for the production of the aromatic polyester carbonates are not only the abovementioned monophenols but also the chlorocarbonic esters of these, and also the acyl chlorides of aromatic monocarboxylic acids, which can optionally have substitution by $C_1$ to $C_{22}$-alkyl groups or by halogen atoms; aliphatic $C_2$ to $C_{22}$-monoacyl chlorides can also be used as chain terminators here.

The quantity of chain terminators in each case is from 0.1 to 10 mol %, based on moles of diphenol in the case of the phenolic chain terminators and on moles of diacyl dichloride in the case of monoacyl chloride chain terminators.

The aromatic polyester carbonates may also comprise incorporated aromatic hydroxycarboxylic acids.

The aromatic polyester carbonates may be either linear or else branched in a known manner; (in this connection see DE-A 2 940 024 and DE-A 3 007 934).

Examples of branching agents that can be used are acyl chlorides of functionality three or higher, e.g. trimesoyl trichloride, cyanuroyl trichloride, 3,3',4,4'-benzophenonetetracarbonyl tetrachloride, 1,4,5,8-naphthalenetetracarbonyl tetrachloride or pyromellitoyl tetrachloride, in quantities of from 0.01 to 1.0 mol % (based on diacyl dichlorides used) or tri- or polyfunctional phenols, such as phloroglucinol, 4,6-dimethyl-2,4,6-tri(4-hydroxyphenyl)hept-2-ene, 4,6-dimethyl-2,4,6-tri(4-hydroxyphenyl)heptane, 1,3,5-tri(4-hydroxyphenyl)benzene, 1,1,1-tri(4-hydroxyphenyl)ethane, tri (4-hydroxyphenyl)phenylmethane, 2,2-bis[4,4-bis(4-hydroxyphenyl)cyclohexyl]propane, 2,4-bis(4-hydroxyphenylisopropyl)phenol, tetra(4-hydroxyphenyl) methane, 2,6-bis(2-hydroxy-5-methylbenzyl)-4-methylphenol, 2-(4-hydroxyphenyl)-2-(2,4- dihydroxyphenyl)propane, tetra(4-[4-hydroxyphenylisopropyl]phenoxy)methane, 1,4-bis[4',4"-dihydroxytriphenyl)methyl]benzene, in quantities of from 0.01 to 1.0 mol %, based on diphenols used. Phenolic branching agents can be used as initial charge with the diphenols, and acyl chloride branching agents can be introduced together with the acyl dichlorides.

The proportion of carbonate structural units in the thermoplastic aromatic polyester carbonates can vary as desired. The proportion of carbonate groups is preferably up to 100 mol %, in particular up to 80 mol %, particularly preferably up to 50 mol %, based on the entirety of ester groups and carbonate groups. The ester fraction of the aromatic polyester carbonates, and also the carbonate fraction thereof, can take the form of blocks or can have random distribution in the polycondensate.

In a preferred embodiment, the weight-average molar mass Mw of component A (determined by gel permeation chromatography (GPC) in methylene chloride with polycarbonate as standard) is from 23 000 g/mol to 40 000 g/mol, preferably from 24 000 g/mol to 35 000 g/mol, in particular from 26 000 to 30000 g/mol.

Component A used can comprise a polycarbonate or polyester carbonate or a mixture of a plurality of polycarbonates and/or polyester carbonates according to the description above.

Component B

Component B is a vinyl copolymer made of

B.1 from 65 to 85% by weight, preferably from 70 to 80% by weight, in particular from 74 to 78% by weight (based in each case on component B) of at least one monomer selected from the group of the vinyl aromatics (for example styrene, α-methylstyrene) and ring-substituted vinyl aromatics (for example p-methylstyrene, p-chlorostyrene) and B.2 from 15 to 35% by weight, preferably from 20 to 30% by weight, in particular from 22 to 26% by weight (based in each case on component B) of at least one monomer selected from the group of the vinyl cyanides (for example unsaturated nitriles such as acrylonitrile and methacrylonitrile), ($C_1$-$C_8$)-alkyl (meth)acrylates (for example methyl methacrylate, n-butyl acrylate, tert-butyl acrylate), unsaturated carboxylic acids and derivatives of unsaturated carboxylic acids (for example maleic anhydride and N-phenylmaleinimide).

The copolymers B are rubber-free. Particular preference is given to a rubber-free copolymer of styrene (B.1) and acrylonitrile (B.2) as component B.

These copolymers are known and can be produced by free-radical polymerization, in particular by emulsion, suspension, solution or bulk polymerization.

The average molar masses $M_w$ (determined by gel permeation chromatography into tetrahydrofuran with polystyrene as standard) of the copolymers are preferably from 15 000 to 250 000 g/mol, with preference from 50 000 to 160 000 g/mol, in particular from 80 000 to 140 000 g/mol.

Component B used can comprise a vinyl copolymer or a mixture of a plurality of vinyl copolymers according to the description above.

Component C

Component C is a sized chopped glass fibre.

These glass fibres according to component C are preferably produced from E, A or C glass. The average diameter of the glass fibre is preferably from 5 to 25 μm, particularly preferably from 6 to 20 μm, most preferably from 7 to 15 μm. The average chopped length of the chopped glass fibres is preferably from 1 to 10 mm, preferably from 2.0 to 7.5 mm, particularly preferably from 2.5 to 5.0 mm.

It is particularly preferable that the "aspect ratio", i.e. the average fibre length: average fibre diameter quotient, of the glass fibres used is at least 100, particularly at least 200, in particular at least 300.

The abovementioned geometric features of the glass fibres (length, diameter and aspect ratio) are determined on the component C used (i.e. before the production and further thermal processing of the composition of the invention). During the production of the compositions by compounding and during further thermal processing thereof to give mouldings, it is naturally not possible to exclude reduction of the said ratio aspect resulting from shearing for example, and the aspect ratio of the glass fibres in the final composition or indeed in the moulding is therefore generally smaller than that originally determined on the component C used.

The glass fibres according to component C have a coating of a size which comprises at least one organic substance or a combination of a plurality of organic substances which can have some extent of chemical bonding to the glass fibre (coupling agents) and which to some extent are present in unbonded form, i.e. achieved physical wetting of the glass fibre without bonding (film-formers, surface-active additives, lubricants, etc.). The unbonded size content, i.e. the content not chemically linked to the glass fibre, can be separated by means of extraction, for example, preferably in dichloromethane, and can be analysed.

Typical coupling agents preferably used are reactively functionalized organosilanes as disclosed by way of example in EP 2 554 594 A1. In a preferred embodiment, the silane has a functional group selected from the group of the amino group, epoxy group, carboxylic acid group, vinyl group and mercapto group for linkage to the polymer of the size, and also from one to three, preferably three, alkoxy groups for linkage to the glass fibre. By way of example, it is preferable to use at least one silane selected from the group consisting of vinyl trichlorosilane, vinyltriethoxysilane, vinyltrimethoxysilane, γ-methacryloxypropyltrimethoxysilane, β-(3,4-epoxycyclohexyl)ethyltrimethoxysilanes, γ-glycidoxypropyltrimethoxysilane, N-β(aminoethyl)γ-aminopropyltrimethoxysilane, γ-aminopropyltriethoxysilane, N-phenyl-γ-aminopropyltrimethoxysilane, γ-mercaptopropyltrimethoxysilane and γ-chloropropyltrimethoxysilane.

Film-formers used can be any type of polymer, for example epoxy resins, polyester resins, polyolefins, polyurethanes, silicones, acrylic polymers, styrenic and other vinyl (co)polymers, polyamides, polyvinyl acetates and mixtures thereof.

Other non-coupling components that can be used are by way of example ethoxylates, natural (animal and vegetable), chemically modified natural and fully synthetic waxes and oils, and also fatty acid esters, preferably with long-chain alcohols.

Components C used in the compositions of the invention feature a low-polarity size. They preferably comprise, as substantive components, substances having aliphatic hydrocarbon chains, and they preferably comprise few or no functional polar groups.

Glass fibres used are those where the ratio of the integrated peak area of the FTIR spectrum in the wave number range from 2700 to 3000 $cm^{-1}$ to the integrated peak area of the FTIR spectrum in the wave number range from 500 to 4000 $cm^{-1}$, in each case measured on the dichloromethane-extracted content of this size of component C, is from 0.20 to 0.70, preferably from 0.25 to 0.60, particularly preferably from 0.30 to 0.55. Examples of suitable glass fibres are Nittobo CS 03 PE 936 (Nitto Boseki Co. Ltd., Japan) and CS 108F-14P (3B Fibreglass, Belgium).

The extraction of the chopped glass fibre takes place in dichloromethane. In each case, 10 g of the glass fibre are extracted for 1 h at 40° C. in 100 ml of dichloromethane. The solution is then concentrated by evaporation, and the resultant residue is studied by IR spectroscopy with spectral resolution 2 cm$^{-1}$ on a KBr window.

The concentration used of the size (entirety of all constituents) is such that the carbon content of component C is from 0.2 to 2% by weight, preferably from 0.3 to 1.0% by weight, and particularly preferably from 0.4 to 0.8% by weight.

The carbon content of the glass fibre (component C) is determined by combustion of the glass fibre in pure oxygen at about 950° C. in an automatic carbon/hydrogen/nitrogen (CHN) analysis machine, and then taking aliquots of the combustion gases, absorption of unwanted components, and then detection of C as $CO_2$ by way of the IR measurement cell.

Component C used can comprise a chopped glass fibre or a mixture of a plurality of chopped glass fibres and/or polyester carbonates according to the description above.

Component D

Component D comprises one graft polymer or a mixture of a plurality of graft polymers of D.1 from 5 to 70% by weight, preferably from 10 to 60% by weight, in particular from 20 to 50% by weight, based on component D, of at least one vinyl monomer on D.2 from 30 to 95% by weight, preferably from 40 to 90% by weight, in particular from 50 to 80% by weight, based on component D, of one elastomeric graft base or a mixture of a plurality of elastomeric graft bases, preferably with glass transition temperature(s)<0° C., particularly <−20° C., in particular <−30° C.

Unless expressly otherwise stated in the present invention, the glass transition temperature is determined for all components by means of dynamic scanning calorimetry (DSC) in accordance with DIN 53765, (1994 Version) with heating rate 10 K/min, Tg being determined as midpoint temperature (tangent method).

Monomers D.1 are preferably mixtures of

D.1.1 from 50 to 99% by weight, preferably from 70 to 80% by weight based on D.1, of vinyl aromatics and/or ring-substituted vinyl aromatics (such as styrene, α-methylstyrene, p-methylstyrene, p-chlorostyrene) and/or ($C_1$-$C_8$)-alkyl methacrylates, for example methyl methacrylate, ethyl methacrylate, and D.1.2 from 1 to 50% by weight, preferably from 20 to 30% by weight, based on D.1, of vinyl cyanide (unsaturated nitriles such as acrylonitrile and methacrylonitrile) and/or ($C_1$-$C_8$)-alkyl (meth)acrylates, for example methyl methacrylate, n-butyl acrylate, tert-butyl acrylate, and/or derivates (such as anhydrides and imides) or unsaturated carboxylic acids, for example maleic anhydride and N-phenylmaleinimide.

Preferred monomers D.1.1 are selected from at least one of the monomers styrene, α-methylstyrene and methyl methacrylate. Preferred monomers D.1.2 are selected from at least one of the monomers acrylonitrile, maleic anhydride and methyl methacrylate. Particularly preferred monomer combinations are D.1.1 styrene and D.1.2 acrylonitrile, and D.1.1 and D.1.2 methyl methacrylate.

The graft bases D.2 suitable for the graft polymers D are butadiene-free in a preferred embodiment, and in a particularly preferred embodiment they are saturated, i.e. in essence free from carbon-carbon double bonds. The expression in essence free from carbon-carbon double bonds means in this context that the concentration of polyunsaturated vinyl monomer during the production of the graft base D.2 does not exceed 5% by weight, preferably does not exceed 2% by weight, based on the graft base D.2.

Particular preference is given to, as D.2, at least one rubber selected from the group consisting of acrylate rubbers, silicone rubbers and silicone acrylate-composite rubbers.

Most preference is given to acrylate rubber as graft base D.2.

Suitable acrylate rubbers according to D.2 are preferably polymers of acryl acrylates, optionally with up to 40% by weight, based on D.2, of other polymerizable monoethylenically unsaturated monomers. Among the preferred polymerizable acrylates are $C_1$ to $C_8$-alkyl esters, for example methyl, ethyl, butyl, n-octyl and 2-ethylhexyl esters; haloalkyl esters, preferably halo-$C_1$-$C_8$-alkyl esters, such as chloroethyl acrylate, and also mixtures of these monomers.

Monomers having more than one polymerizable double bond can be copolymerized in the acrylate rubbers for crosslinking purposes. Preferred examples of crosslinking monomers are esters of unsaturated monocarboxylic acids having from 3 to 8 carbon atoms and unsaturated monohydric alcohols having from 3 to 12 carbon atoms or of saturated polyols having from 2 to 4 OH groups and from 2 to 20 carbon atoms, for example ethylene glycol dimethacrylate, allyl methacrylate; polyunsaturated heterocyclic compounds, for example trivinyl cyanurate and triallyl cyanurate; polyfunctional vinyl compounds, for example di- and trivinylbenzenes; and also triallyl phosphate and diallyl phthalate. Preferred crosslinking monomers are allyl methacrylate, ethylene glycol dimethacrylate, diallyl phthalate and heterocyclic compounds having at least three ethylenically unsaturated groups. Particularly preferred crosslinking monomers are the cyclic monomers triallyl cyanurate, triallyl isocyanurate, triacryloylhexahydro-s-triazine, and triallylbenzenes. The quantity of the crosslinking monomers is preferably from 0.02 to 5% by weight, in particular from 0.05 to 2% by weight based on the graft base D.2. The quantity of cyclic crosslinking monomers having at least three ethylenically unsaturated groups is advantageously restricted to less than 1% by weight of the graft base D.2.

Examples of preferred "other" polymerizable ethylenically unsaturated monomers which, alongside the acrylates, can optionally serve for the production of the graft base D.2 are acrylonitrile, styrene, α-methylstyrene, acrylamides, vinyl $C_1$-$C_6$-alkyl ethers and methyl methacrylate.

Other suitable graft bases D.2 are silicone rubbers having active grafting sites, as described in DE-OS (German Published Specification) 3 704 657, DE-OS (German Published Specification) 3 704 655, DE-OS (German Published Specification) 3 631 540 and DE-OS (German Published Specification) 3 631 539.

It is also possible to use silicone-acrylate-composite rubber as graft base D.2. These silicone-acrylate-composite rubbers are preferably composite rubbers having active grafting sites comprising from 10 to 90% by weight of silicone rubber content and from 90 to 10% by weight of polyalkyl (meth)acrylate rubber content, where the two rubber components mentioned in the composite rubber penetrate into one another in such a way that in essence they cannot be separated from one another.

Silicone-acrylate composite rubbers are known and are described by way of example in U.S. Pat. No. 5,807,914, EP 430134 and U.S. Pat. No. 4,888,388.

Suitable silicone rubber components D.2.1 of the silicone-acrylate-composite rubbers according to D.2 are silicone rubbers having active grafting sites produced by methods described by way of example in U.S. Pat. Nos. 2,891,920, 3,294,725, DE-OS 3 631 540, EP 249964, EP 430134 and U.S. Pat. No. 4,888,388.

The silicone rubber according to D.2.1 is preferably produced by emulsion polymerization in which siloxane monomer units, crosslinking or branching agents (IV) and optionally grafting agents (V) are used.

Examples of siloxane monomer units used are preferably dimethylsiloxane and cyclic organosiloxanes having at least 3 ring members, preferably from 3 to 6 ring members, for example preferably hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenyl cyclotetrasiloxanes, octaphenylcyclotetrasiloxane.

The organosiloxane monomers can be used alone or in the form of mixtures with 2 or more monomers. The silicone rubber preferably comprises no less than 50% by weight and particularly preferably no less than 60% by weight of organosiloxane, based on the total weight of the silicone rubber component.

Crosslinking or branching agents (IV) used are preferably silane-based crosslinking agents with functionality 3 or 4, particularly preferably 4. The following may be mentioned as preferred examples: trimethoxymethylsilane, triethoxyphenylsilane, tetramethoxysilane, tetraethoxysilane, tetra-n-propoxysilane and tetrabutoxysilane. The crosslinking agent can be used alone or in a mixture of two or more. Particular preference is given to tetraethoxysilane.

The range of quantities used of the crosslinking agent is from 0.1 to 40% by weight, based on the total weight of the silicone-rubber component. The quantity of crosslinking agents selected is such that the degree of swelling of the silicone rubber measured in toluene is from 3 to 30, preferably between 3 and 25, and particularly preferably from 3 to 15. The degree of swelling is defined as the ratio by weight of the quantity of toluene absorbed by the silicone rubber when it is saturated with toluene at 25° C. to the quantity of silicone rubber in the dry state. Determination of the degree of swelling is described in detail in EP 249964.

If the degree of swelling is less than 3, i.e. if the content of crosslinking agent is too high, the elastomeric properties of the silicone rubber are inadequate. If the swelling index is greater than 30, the silicone rubber cannot form a domain structure in the matrix polymer, and is therefore unable to provide improvement of impact resistance; the effect would then be similar to simple addition of polydimethylsiloxane.

Tetrafunctional crosslinking agents are preferred to trifunctional crosslinking agents because it is then easier to control the degree of swelling within the limits described above.

Suitable grafting agents (V) are compounds capable of forming structures of the following formulae:

$$CH_2=C(R^9)-COO-(CH_2)_p-SiR^{10}{}_nO_{(3-n)/2} \quad (V-1)$$

$$CH_2=CH-SiR^{10}{}_nO_{(3-n)/2} \quad (V-2) \text{ or}$$

$$HS-(CH_2)_p-SiR^{10}{}_nO_{(3-n)/2} \quad (V-3),$$

where
R9 is hydrogen or methyl,
R10 is C1-C4-alkyl, preferably methyl, ethyl or propyl, or phenyl,
n is 0, 1 or 2 and
p is an integer from 1 to 6.

Acryloyl- or methacryloyloxysilanes are particularly suitable for forming the abovementioned structure (V-1), and have high grafting efficiency. This assures effective formation of the graft chains, and hence is advantageous for the impact resistance of the resulting resin composition.

The following may be mentioned as preferred examples: β-methacryloyloxy-ethyldimethoxymethylsilane, γ-methacryloyloxypropylmethoxydimethylsilane, γ-methacryloyloxypropyl dimethoxymethylsilane, γ-methacryloyloxypropyltrimethoxysilane, γ-methacryloyloxypropylethoxydiethylsilane, γ-methacryloyloxypropyldiethoxymethylsilane, δ-methacryloyloxybutyldiethoxymethylsilanes and mixtures thereof.

Preference is given to use of from 0 to 20% by weight of grafting agent, based on the total weight of the silicone rubber.

The silicone rubber can be prepared by emulsion polymerization, as by way of example described in U.S. Pat. Nos. 2,891,920 and 3,294,725. The silicone rubber is produced here in the form of an aqueous latex. For this, a mixture comprising organosiloxane, crosslinking agent and optionally grafting agent is mixed with water while exposed to shear, for example by using a homogenizer, in the presence of a sulphonic-acid-based emulsifier, e.g. alkylbenzenesulphonic acid or alkylsulphonic acid, whereupon the mixture completes its polymerization to give the silicone rubber latex. An alkylbenzenesulphonic acid is particularly suitable because it acts not only as emulsifier but also as polymerization initiator. A combination of the sulphonic acid with a metal salt of an alkylbenzenesulphonic acid or with a metal salt of an alkylsulphonic acid is advantageous here because it stabilizes the polymer during the subsequent graft polymerization.

After the polymerization the reaction is terminated by neutralizing the reaction mixture via addition of an aqueous alkaline solution, e.g. via addition of an aqueous sodium hydroxide, potassium hydroxide or sodium carbonate solution.

Suitable polyalkyl (meth)acrylate rubber components D.2.2 of the silicone-acrylate-composite rubbers according to D.2 can be produced from alkyl methacrylates and/or alkyl acrylates, a crosslinking agent (VI) and a grafting agent (VII). Preferred examples here of alkyl methacrylates and/or alkyl acrylates are the C1 to C8-alkyl esters, for example methyl, ethyl, n-butyl, tert-butyl, n-propyl, n-hexyl, n-octyl, n-lauryl and 2-ethylhexyl esters; haloalkyl esters, preferably halo-C1-C8-alkyl esters, for example chloroethyl acrylate, and also mixtures of these monomers. Particular preference is given to n-butyl acrylate.

Crosslinking agents (VI) that can be used for the polyalkyl (meth)acrylate rubber component of the silicone-acrylate rubber can be monomers having more than one polymerizable double bond. Preferred examples of crosslinking monomers are esters of unsaturated monocarboxylic acids having from 3 to 8 carbon atoms and unsaturated monohydric alcohols having from 3 to 12 carbon atoms, or of saturated polyols having from 2 to 4 OH groups and from 2 to 20 carbon atoms, for example ethylene glycol dimethacrylate, propylene glycol dimethacrylate, 1,3-butylene glycol dimethacrylate and 1,4-butylene glycol dimethacrylate. The crosslinking agents can be used alone or in mixtures of at least two crosslinking agents.

Preferred examples of grafting agents (VII) are allyl methacrylate, triallyl cyanurate, triallyl isocyanurate and mixtures thereof. It is also possible to use allyl methacrylate as crosslinking agent (VI). The grafting agents can be used alone or in mixtures of at least two grafting agents.

The quantity of crosslinking agent (VI) and grafting agent (VII) is from 0.1 to 20% by weight, based on the total weight of the polyalkyl (meth)acrylate rubber component of the silicone-acrylate rubber.

The silicone acrylate-composite rubber is produced by first producing the silicone rubber according to D.2.1 in the form of aqueous latex. This latex is then supplemented with the alkyl methacrylate and/or alkyl acrylates to be used, the crosslinking agent (VI) and the grafting agent (VII), and polymerization is carried out. Preference is given to emulsion polymerization initiated by free radicals, for example by a peroxide initiator, or an azo or redox initiator. It is particularly preferable to use a redox initiator system, specifically a sulphoxylate initiator system produced by combining iron sulphate, disodium ethylenediaminetetraacetate, Rongalit and hydroperoxide.

The grafting agent (V) used during the production of the silicone rubber results in covalent linkage of the polyalkyl (meth)acrylate rubber content to the silicone rubber content. During polymerization the two rubber components penetrate into one another and thus form the composite rubber, after polymerization this can no longer be separated into its constituents of silicone rubber component and polyalkyl (meth)acrylate rubber component.

The silicone-acrylate-composite graft rubbers mentioned as component D are produced by grafting the monomers D.1 onto the rubber base D.2.

This can be achieved by using the polymerization methods described by way of example in EP 249964, EP 430134 and U.S. Pat. No. 4,888,388.

The graft polymerization is achieved by way of example by the following polymerization method: a single- or multistage emulsion polymerization initiated by free radicals is used to polymerize the desired vinyl monomers D.1 onto the graft base, which is in the form of an aqueous latex. The intention here is to maximize graft efficiency, which is preferably greater than or equal to 10%. The graft efficiency depends to a decisive extent on the grafting agent (V) and, respectively, (VII) used. After polymerization to give the silicone (acrylate) graft rubber, the aqueous latex is added to hot water in which metal salts have previously been dissolved, an example being calcium chloride or magnesium sulphate. The silicone (acrylate) graft rubber coagulates here, and can then be separated.

The graft copolymers D are produced by free radical polymerization, preferably by emulsion polymerization.

The median particle size ($d_{50}$ value) of the graft base D.2 is generally from 0.05 to 1 μm, preferably from 0.07 to 0.5 μm, particularly preferably from 0.1 to 0.4 μm. The median particle size $d_{50}$ is the diameter above and below which respectively 50% by weight of the particles lie. It can be determined by means of ultracentrifuge measurement (W. Scholtan, H. Lange, Kolloid, Z. and Z. Polymere 250 (1972), 782-1796).

In the case of graft polymers produced by emulsion polymerization, the gel content of the graft base D.2 is preferably at least 30% by weight, particularly preferably at least 40% by weight, in particular at least 50% by weight (measured in toluene). The gel content is determined at 25° C. in a suitable solvent as content insoluble in the said solvent (M. Hoffmann, H. Krömer, R. Kuhn, Polymeranalytik I and II, Georg Thieme-Verlag, Stuttgart 1977).

It is known that the graft polymers are not necessarily entirely grafted on the graft base during the grafting reaction, and therefore products which are obtained via (co) polymerization of the graft polymers D.1 in the presence of the graft base D.2 and are produced during the work-up are also considered to be graft polymers D according to the invention. These products according to component D can accordingly also comprise free (co)polymer of the graft monomers, i.e. (co)polymer not chemically bonded to the rubber.

Component E

The composition can comprise, as component E, commercially available additives, and in particular here it is preferably possible to use additives selected from the group of the flame retardants (e.g. organic phosphorus compounds or organic halogen compounds, in particular bisphenol-A-based oligophosphate), antidripping agents (for example compounds classified as fluorinated polyolefins, silicones, and also aramid fibres), flame retardant synergistics (for example nanoscale metal oxides), smoke inhibitors (for example zinc borate), lubricants and mould-release agents (for example pentaerythritol tetrastearate), nucleating agents, antistatic agents, conductivity additives, stabilizers (e.g. hydrolysis stabilizers, heat-ageing stabilizers and UV stabilizers, and also transesterification inhibitors and acid/base quenchers), flowability promoters, compatibilizers, other impact modifiers differing from component D (either with or without core-structure), other polymeric constituents (for example functional blend partners), fillers differing from component C and reinforcing materials differing from component C (for example carbon fibres, talc, mica, kaolin, $CaCO_3$) and also dyes and pigments (for example titanium dioxide or iron oxide).

Production of the Moulding Compositions (i.e. Compound Materials) and Mouldings

The thermoplastic moulding compositions of the invention can by way of example be produced by mixing the respective constituents in a known manner and, at temperatures of from 200° C. to 320° C., preferably from 240 to 300° C. in conventional assemblies such as internal mixers, extruders and twin-screw systems, compounding the same in the melt and extruding the same in the melt.

The mixing of the individual constituents may be carried out in a known manner, either successively or simultaneously, either at about 20° C. (room temperature) or at a higher temperature.

In a preferred embodiment, the compositions of the invention are produced in a twin-screw extruder where components A, B, D and E are first melted and mixed, and then the glass fibres C are introduced by way of an ancillary extruder into the melt mixture and are dispersed therein.

The invention therefore also provides a process for the production of the compositions of the invention.

The moulding compositions of the invention can be used for the production of mouldings of any type. These can by way of example be produced by injection moulding, extrusion or blow-moulding processes. Another type of processing is the production of mouldings by thermoforming from prefabricated sheets or films.

Examples of these mouldings are films, profiles, housing parts of any type, e.g. for domestic equipment such as juice presses, coffee machines, mixers; for office machinery such as monitors, flat screens, notebooks, printers, copiers; sheets, pipes, electrical-installation ducts, windows, doors and other profiles for the construction sector (internal fitting-out and external application), and also electrical and electronic components such as switches, plugs and sockets, and components for commercial vehicles, in particular for the automobile sector. The compositions of the invention are also suitable for the production of the following mouldings or moulded parts: Components for internal fitting-out of rail vehicles, of ships, of aircraft, of buses and other motor vehicles, bodywork components for motor vehicles, housings of electrical equipment comprising small transformers, housings for equipment for the processing and transmission of information, housings and cladding for medical equipment, massage equipment and housings therefor, toy vehicles for children, large-surface-area wall elements, housings for safety equipment, thermally insulated transport containers, moulded parts for sanitation equipment and for bath equipment, protective grilles for ventilation openings and housings for garden equipment.

EXAMPLES

Component A-1:

Linear polycarbonate based on bisphenol A with weight-average molar mass $M_w$ 25 000 g/mol, determined by GPC in methylene chloride with polycarbonate standards.

Component A-2:

Linear polycarbonate based on bisphenol A with weight-average molar mass $M_w$ 28 000 g/mol, determined by GPC in methylene chloride with polycarbonate standards.

Component A-3:

Linear polycarbonate based on bisphenol A with weight-average molar mass $M_w$ 32 000 g/mol, determined by GPC in methylene chloride with polycarbonate standards.

Component B-1:

SAN copolymer with 23% by weight acrylonitrile content and with weight-average molar mass $M_w$ about 130 000 g/mol, determined by GPC in THF with polystyrene standards.

Component B-2:

SAN copolymer with 24% by weight acrylonitrile content and with weight-average molar mass $M_w$ about 170 000 g/mol, determined by GPC in THF with polystyrene standards.

Component C-1:

Nittobo CS 03 PE 937 (Nitto Boseki Co. Ltd., Japan): Chopped glass fibre with average diameter 13 μm and chopped length 3 mm. The carbon content of component C-1 is 0.6% by weight (determined as described below).

The ratio of the integrated peak area of the FTIR spectrum in the wave number range from 2700 to 3000 $cm^{-1}$ to the integrated peak area of the FTIR spectrum in the wave number range from 500 to 4000 $cm^{-1}$, in each case measured on the dichloromethane-extracted content of this size of component C, is 0.13.

This glass fibre is the component characterized as C-1 in WO 2009/021648 A1.

Component C-2:

Nittobo CS 03 PE 936 (Nitto Boseki Co. Ltd., Japan): Chopped glass fibre with average diameter 13 μm and chopped length 3 mm. The carbon content of component C-2 is 0.7% by weight (determined as described below).

The ratio of the integrated peak area of the FTIR spectrum in the wave number range from 2700 to 3000 $cm^{-1}$ to the integrated peak area of the FTIR spectrum in the wave number range from 500 to 4000 $cm^{-1}$, in each case measured on the dichloromethane-extracted content of this size of component C, is 0.53.

Component C-3:

CS 108F-14P (3B Fibreglass, Belgium): Chopped glass fibre with average diameter 14 μm and chopped length 4 mm. The carbon content of component C-3 is 0.5% by weight (determined as described below).

The ratio of the integrated peak area of the FTIR spectrum in the wave number range from 2700 to 3000 $cm^{-1}$ to the integrated peak area of the FTIR spectrum in the wave number range from 500 to 4000 $cm^{-1}$, in each case measured on the dichloromethane-extracted content of this size of component C, is 0.31.

Component D-1:

Metablen® S2030 (Mitsubishi Rayon, Japan): Methyl-methacrylate-grafted silicone-acrylate-composite rubber.

Component D-2:

KaneAce™ M410 (Kaneka, Belgium): Graft polymer with core-shell structure composed of a butyl acrylic rubber as graft base and of a polymethyl methacrylate graft shell.

Component E-1:

Pentaerythritol tetrastearate as lubricant/mould-release agent.

Component E-2:

Irganox® B 900 stabilizer mixture (BASF, Germany).

Component E-3:

Kronos® 2233 titanium dioxide (Kronos Titan GmbH, Germany).

Production and Testing of the Moulding Compositions of the Invention

The components are mixed in a ZSK-25 twin-screw extruder from Werner & Pfleiderer at a melt temperature of 260° C. The mouldings are produced at a melt temperature of 260° C. and at a mould temperature of 80° C. in an Arburg 270 E injection-moulding machine.

Melt viscosity measured at 260° C. and at a shear rate of 1000 $s^{-1}$ in accordance with ISO 11443 (2014 Version) serves as a measure of melt flowability.

Impact resistance and notched impact resistance are determined at 23° C. according to ISO 180-1U (1982 Version) and, respectively, ISO 180-1A (1982 Version) on test samples measuring 80 mm×10 mm×4 mm.

Tensile strain at break and tensile modulus of elasticity are determined in accordance with ISO 527 (1996 Version) at room temperature (23° C.).

The penetration tests are carried out at room temperature on sheets measuring 60 mm×60 mm×3 mm by using an instrumented vertical drop system with drop weight (m) 1.86 kg, head diameter 20 mm, support diameter 40 mm, and drop height variation (h=5-140 cm). The maximal height of the drop head at which no damage to (cracking of) the test samples occurred was determined as a measure of multiaxial ductility of the material. The maximal drop height is converted to critical energy E=m·g·h, where m is the drop weight, g is the gravitational constant and h is the drop height.

Extraction of the chopped glass fibre takes place in dichloromethane. In each case 10 g of the glass fibre are extracted for 1 h at 40° C. in 100 ml of dichloromethane. The solution is then concentrated by evaporation, and the resultant residue is studied by IR spectroscopy (Nicolet Avatar measurement instrument) on a KBr window with spectral resolution 2 $cm^{-1}$.

The carbon content of the glass fibre (component C) is determined by combustion of the glass fibre in pure oxygen at about 950° C. in an automatic (CHN) analysis machine (LECO TruSpec measurement instrument), and then taking aliquots of the combustion gases, absorption of unwanted components, and then detection of C as $CO_2$ by way of an IR measurement cell.

TABLE 3

The compositions and their properties

| Components [parts by weight] | 1 (comp.) | 2 | 3 | 4 (comp.) | 5 (comp.) | 6 | 7 | 8 | 9 | 10 | 11 |
|---|---|---|---|---|---|---|---|---|---|---|---|
| A-1 PC | — | — | — | — | — | — | — | — | — | 62.00 | — |
| A-2 PC | 62.00 | 62.00 | 62.00 | 62.00 | 62.00 | 62.00 | 62.00 | 69.00 | — | — | 62.00 |
| A-3 PC | — | — | — | — | — | — | — | — | 62.00 | — | — |
| B-1 SAN | 26.90 | 26.90 | 26.90 | 26.90 | 24.40 | 24.40 | 24.40 | 17.40 | 24.40 | 24.40 | — |
| B-2 SAN | — | — | — | — | — | — | — | — | — | — | 24.40 |
| C-1 GF 937 | 10.00 | — | — | 10.00 | 10.00 | — | — | — | — | — | — |
| C-2 GF 936 | — | 10.00 | — | — | — | 10.00 | — | 10.00 | 10.00 | 10.00 | 10.00 |
| C-3 GF 108F | — | — | 10.00 | — | — | — | 10.00 | — | — | — | — |
| D-1 Metablen S2030 | 0.50 | 0.50 | 0.50 | 0.50 | 3.00 | 3.00 | 3.00 | 3.00 | 3.00 | 3.00 | 3.00 |
| D-2 Kane Ace M410 | — | — | — | — | — | — | — | — | — | — | — |
| E-1 PETS | 0.50 | 0.50 | 0.50 | 0.50 | 0.50 | 0.50 | 0.50 | 0.50 | 0.50 | 0.50 | 0.50 |
| E-2 Irganox B900 | 0.10 | 0.10 | 0.10 | 0.10 | 0.10 | 0.10 | 0.10 | 0.10 | 0.10 | 0.10 | 0.10 |
| E-3 Titanium dioxide | — | — | — | 3.00 | — | — | — | — | — | — | — |
| Properties | | | | | | | | | | | |
| Impact resistance $a_n$ [kJ/m$^2$] | 37 | 47 | 46 | 33 | 40 | 59 | 65 | 67 | 50 | 75 | 53 |
| Notched impact resistance $a_K$ [kJ/m$^2$] | 8 | n.m. | n.m. | 7 | 8 | 14 | 12 | n.m. | n.m | n.m | n.m |
| Melt viscosity [Pas] | 198 | 190 | 176 | 197 | 197 | 204 | 205 | 241 | 182 | 215 | 232 |
| Tensile strain at break [%] | 3 | 8 | 8 | 5 | 4 | 17 | 10 | 9 | 8 | 11 | 8 |
| Tensile modulus of elasticity >4000 MPa | yes | yes | yes | yes | yes | yes | yes | yes | yes | yes | yes |
| Penetration [J] | 1 | 2 | n.m. | n.m. | 1 | 9 | 4 | n.m. | n.m. | n.m. | n.m. |

| Components [parts by weight] | 12 | 13 | 14 | 15 | 16 | 17 | 18 | 19 | 20 | 21 |
|---|---|---|---|---|---|---|---|---|---|---|
| A-1 PC | — | — | — | — | — | — | — | — | — | — |
| A-2 PC | 62.00 | 62.00 | 62.00 | 62.00 | 62.00 | 62.00 | 62.00 | 62.00 | 62.00 | 62.00 |
| A-3 PC | — | — | — | — | — | — | — | — | — | — |
| B-1 SAN | 26.90 | 24.40 | 22.40 | 19.40 | 17.40 | 22.90 | 21.40 | 19.40 | 17.40 | 24.40 |
| B-2 SAN | — | — | — | — | — | — | — | — | — | — |
| C-1 GF 937 | — | — | — | — | — | — | — | — | — | — |
| C-2 GF 936 | 10.00 | 10.00 | 10.00 | — | — | 8.50 | 10.00 | 12.00 | 14.00 | 10.00 |
| C-3 GF 108F | — | — | — | 10.00 | 10.00 | — | — | — | — | — |
| D-1 Metablen S2030 | — | — | — | 8.00 | 10.00 | — | — | — | — | — |
| D-2 Kane Ace M410 | 0.50 | 3.00 | 5.00 | — | — | 6.00 | 6.00 | 6.00 | 6.00 | 3.00 |
| E-1 PETS | 0.50 | 0.50 | 0.50 | 0.50 | 0.50 | 0.50 | 0.50 | 0.50 | 0.50 | 0.50 |
| E-2 Irganox B900 | 0.10 | 0.10 | 0.10 | 0.10 | 0.10 | 0.10 | 0.10 | 0.10 | 0.10 | 0.10 |
| E-3 Titanium dioxide | — | — | — | — | — | — | — | — | — | 3.00 |
| Properties | | | | | | | | | | |
| Impact resistance $a_n$ [kJ/m$^2$] | 57 | 65 | 73 | 97 | 109 | 93 | 77 | 67 | 60 | 86 |
| Notched impact resistance $a_K$ [kJ/m$^2$] | n.m | n.m | 14 | 20 | 23 | n.m | 13 | 14 | n.m | n.m |
| Melt viscosity [Pas] | 189 | 200 | 195 | 217 | 224 | 211 | 209 | 215 | 237 | 204 |
| Tensile strain at break [%] | 10 | 14 | 14 | 19 | 17 | 15 | 16 | 14 | 11 | 16 |
| Tensile modulus of elasticity >4000 MPa | yes | yes | yes | yes | no | no | yes | yes | yes | yes |
| Penetration [J] | 2 | 13 | 18 | n.m. | n.m. | n.m. | 13 | 16 | n.m. | 9 | n.m.: not measured

From Table 1 it can be seen that the compositions 2-3 of the invention, and also 6-21, achieve the object of the invention.

In particular, it can be seen from the Table that the Inventive Examples 2 and 3 comprising glass fibre (component C) of the invention exhibit better toughness and tensile strain at break than Comparative Example 1 comprising glass fibre not satisfying the criteria for component C, and also that an analogous conclusion applies to Inventive Examples 6 and 7 in comparison with Comparative Example 5, while there is no significant adverse effect on melt flowability.

Comparison of Inventive Examples 3, 7, 15 and 16, and also comparison of Inventive Examples 12 to 14, reveals the effect of the content of graft polymer (component D) on the properties of the materials. As graft polymer content increases, toughness rises; although melt flowability decreases slightly, it remains at an acceptable level as long as the selected content of graft polymer is not too high; once the concentration of graft polymer becomes greater than 8 parts by weight, tensile modulus of elasticity decreases and falls below the range greater than 4000 MPa that is preferably to be achieved. Surprisingly, tensile strain at break likewise decreases once graft polymer content reaches 8 parts by weight here.

Inventive Examples 17 to 20 reveal that the object of the invention is achieved at glass fibre concentrations of from 8.5 to 14 parts by weight, but that when the concentration is 8.5 parts by weight the tensile modulus of elasticity preferably to be achieved, greater than 4000 MPa, is no longer achieved.

Comparison of Inventive Examples 2 and 12 and, respectively 6 and 13 reveals that a graft polymer (component D) based on acrylate rubber as graft base has a favourable influence on the toughness properties of the materials.

Comparison of Inventive Examples 6 and 8 reveals that polycarbonate content has a strongly adverse influence on the melt flowability and tensile strain at break of the compositions, and that increased polycarbonate content achieves only a slight improvement of impact resistance.

Comparison of Inventive Examples 6, 9 and 10 reveals the influence of the weight-average molar mass of the polycarbonate (component A). As expected, melt viscosity decreases with increasing $M_w$, as does toughness. Surprisingly, however, improved tensile strain at break is observed in the region of moderate molar masses in comparison with higher and lower molar masses, and these moderate molar masses are therefore considered as particularly preferred for the purposes of the object of this invention.

Comparison of Inventive Examples 6 and 11 reveals the influence of the weight-average molar mass of the SAN polymer (component B). Surprisingly, as SAN molar mass increases a decrease of impact resistance and tensile strain at break is also observed, alongside the expected deterioration of melt flowability, and the lower molar masses are therefore regarded as particularly preferred for the purposes of the object of this invention.

Comparison of the Comparative Examples 1 and 4 of the prior art with the Inventive Examples 13 and 21 reveals that the composition of the invention also retains its impact resistance when pigmented with inorganic pigments (in this case titanium dioxide by way of example), and that this can indeed also be increased by adding pigment, whereas pigmentation by inorganic pigments has a severely adverse effect on the impact resistance of compositions of the prior art.

The invention claimed is:

1. A composition consisting of
   A) from 50 to 70 parts by weight of aromatic polycarbonate or polyester carbonate,
   B) from 15 to 30 parts by weight of rubber-free vinyl copolymer,
   C) from 7-15 parts by weight of organically surface-modified chopped glass fibre,
   D) from 1 to 8 parts by weight of a graft polymer with an elastomeric graft base, wherein the graft base consists of acrylate rubber,
   E) from 0.1 to 10_parts by weight of additives,
   where the sum of the parts by weight of components A) to E) in the composition is standardized to 100,
   wherein
   (i) a size composed of an organic compound or a mixture of various organic compounds is used as surface-modification of the glass fibre at a concentration such that the carbon content of component C is from 0.2 to 2% by weight,
   (ii) the ratio of the integrated peak area of the FTIR spectrum in the wave number range from 2700 to 3000 cm$^{-1}$ to the integrated peak area of the FTIR spectrum in the wave number range from 500 to 4000 cm$^{-1}$, in each case measured on the dichloromethane-extracted content of this size of component C, is from 0.20 to 0.70.

2. The composition according to claim 1 consisting of
   A) from 57 to 65 parts by weight of aromatic polycarbonate or polyester carbonate,
   B) from 20 to 25 parts by weight of rubber-free, thermoplastic and resin-like vinyl copolymer,
   C) from 9 to 14 parts by weight of organically surface-modified chopped glass fibre,
   D) from 2.5 to 6 parts by weight of a graft polymer with an elastomeric graft base,
   E) from 0.2 to 5 parts by weight of additives,
   where the sum of the parts by weight of components A) to E) in the composition is standardized to 100.

3. The composition according to claim 1, wherein the carbon content of component C is from 0.4 to 0.8% by weight.

4. The composition according to claim 1, wherein the ratio of the integrated peak area of the FTIR spectrum in the wave number range from 2700 to 3000 cm$^{-1}$ to the integrated peak area of the FTIR spectrum in the wave number range from 500 to 4000 cm$^{-1}$, in each case measured on the dichloromethane-extracted content of this size of component C, is from 0.25 to 0.60.

5. The composition according to claim 1, wherein the ratio of the integrated peak area of the FTIR spectrum in the wave number range from 2700 to 3000 cm$^{-1}$ to the integrated peak area of the FTIR spectrum in the wave number range from 500 to 4000 cm$^{-1}$, in each case measured on the dichloromethane-extracted content of this size of component C, is from 0.30 to 0.55.

6. The composition according to claim 1, wherein the length of at least 70% of the glass fibres in the compounded material produced is at least 100 μm.

7. Compositions according to claim 1, wherein the proportion present of component E is at least 0.1 part by weight and component E comprises at least one inorganic pigment.

8. Compositions according to claim 1, wherein a styrene-acrylonitrile copolymer with weight-average molar mass not more than 140 000 g/mol, determined by gel permeation chromatography in THF with polystyrene standards, is used as component B.

9. Compositions according to claim 1, wherein a polycarbonate based on bisphenol A with weight-average molar mass from 26 000 to 30 000 g/mol, determined by gel permeation chromatography in dichoromethane with polycarbonate standards, is used as component A.

10. The composition according to claim 1, comprising, as component E, at least one additional substance selected from the group consisting of flame retardants, antidripping agents, flame retardant synergists, smoke inhibitors, lubricants and mould-release agents, nucleating agents, antistatic agents, conductivity agents, stabilizers, flowability promoters, compatibilizers, other impact modifiers differing from component D, other polymeric blend partners, fillers differing from component C, reinforcing materials differing from component C, dyes and pigments.

11. A method comprising providing the composition according to claim 1 and producing injection mouldings or thermoformed mouldings.

12. A moulding obtained from compositions according to claim 1.

* * * * *